United States Patent [19]
Chan et al.

[11] Patent Number: 5,351,146
[45] Date of Patent: Sep. 27, 1994

[54] ALL-OPTICAL NETWORK ARCHITECTURE

[75] Inventors: Vincent W. S. Chan, Lincoln; Robert G. Gallager, Winchester, both of Mass.; Alan J. Kirby, Hollis, N.H.; Adel A. M. Saleh, Holmdel, N.J.

[73] Assignees: AT&T Bell Laboratories, Murray Hill, N.J.; Digital Equipment Corporation, Maynard; Massachusetts Institute of Technology, Cambridge, both of Mass.

[21] Appl. No.: 24,655

[22] Filed: Mar. 1, 1993

[51] Int. Cl.$^5$ .................................. H04B 10/20
[52] U.S. Cl. .................................. 359/118; 359/125; 359/123; 370/69.1
[58] Field of Search ................ 359/117, 118–119, 359/120–121, 124–125, 123, 164; 370/69.1, 73, 124

[56] References Cited

U.S. PATENT DOCUMENTS

| | | | |
|---|---|---|---|
| 4,712,859 | 12/1987 | Albanese et al. | 359/120 |
| 4,809,362 | 2/1989 | Claus et al. | 359/120 |
| 5,189,541 | 2/1993 | Konishi | 359/118 |
| 5,208,691 | 5/1993 | Nishio | 359/117 |
| 5,241,409 | 8/1993 | Hill et al. | 359/117 |

FOREIGN PATENT DOCUMENTS

| | | | |
|---|---|---|---|
| 2241847 | 9/1991 | United Kingdom | 359/120 |

OTHER PUBLICATIONS

Gerla et al. "High-Speed Local-Area Networks" IEEE Spectrum, Aug. 1991–pp. 26–31.

"Non-Coherent Photonic Frequency-Multiplexed Access Networks", I. P. Kaminow IEEE Network Magazine, vol. 3, No. 2, Mar. 1989, pp. 4–12.

"FDMA-FSK Star Network With a Tunable Optical Filter Demultiplexer" I. P. Kaminow, et al., Jour. Lightwave Tech., vol. 6, No. 9, Sep. 1988 pp. 1406–1414.

"FSK with Direct Detection in Optical Multiple-Access FDM Networks" I. P. Kaminow, IEEE Journal of Selected Areas in Comm., vol. 8, No. 6, Aug. 1990 pp. 1005–1014.

Primary Examiner—Richard E. Chilcot, Jr.
Assistant Examiner—Kinfe-Michael Negash
Attorney, Agent, or Firm—Eli Weiss; Stuart H. Mayer

[57] ABSTRACT

There is disclosed the architecture for an all optic network which employs a three level hierarchy using wavelength vision multiplexing. At the lowest level of the hierarchy are Level-0 all optical networks. The Level-0 networks are "local" broadcast networks each of which supports a plurality of access ports and each access port can hear all the local traffic transmitted by all other access ports in the same Level-0 network. Each Level-0 network shares wavelengths internally, but there is extensive reuse of wavelengths among different Level-0 networks. The next higher level, which is the intermediate level, Level-1, is essentially a wavelength router coupled with one or more of the Level-0 networks to provide a wavelength path to one or more directly connect Level-0 networks or, in combination with a Level-2 network, a light path to one or more Level-0 network outside itself. The Level-2 are second level wavelength routing networks which provide light paths, as opposed to wavelength paths, between Level-1 networks. The Level-2 networks may be as simple as fiber trunks alone or they may employ frequency changing devices in addition to wavelength routers and/or spatial switches.

29 Claims, 7 Drawing Sheets

ALL-OPTICAL NETWORK ARCHITECTURE

The invention was made with Government support under Grant No. MDA-972-92-J-1038 awarded by The Advanced Research Projects Agency. The Government has certain rights in the invention.

TECHNICAL FIELD

This invention relates to an optical fiber transmission network and more specifically to a multilevel all-optical network architecture.

BACKGROUND OF THE INVENTION

Present day commercial lightwave transmission networks use optical fibers to carry large amounts of multiplexed information over long distances from a transmit terminal to a receive terminal. Most long-haul transmission lines and a substantial portion of short-haul transmission lines such as inter-office and intra-office links, local area networks (LANs), metropolitan ea networks (MANs), and wide area network (WANs) are optical and, therefore, the information is carried over an optical fiber. A major advantage of transmitting information in optical form is the very large bandwidth and low losses associated with single mode optical fibers.

In practice, at the transmitting end of an optical fiber, electrical signals representative of intelligence are transformed into optical signals for transmission along the optical fiber and, at the receiving end, are transformed back into electrical signals for further processing. Furthermore, in today's networks, the optical signals are converted to electrical signals, and back to optical, in order to use electronic switches to switch the various channels to their destinations, and/or to perform electronic regeneration in very long links. This optical-to-electronic conversion within the network restricts the users to pre-specified signaling formats. It also makes the continuous upgrading and enhancement of the networks costly and cumbersome.

It is realized that with an all-optical network where optical signals can flow between users across the network without being converted to electronic signals within the network, the tens of terahertz of bandwidth available in optical fibers can be accessed in a more flexible and economic way. The benefits and advantages of being able to optically access the very broad bandwidth of optical fibers will permit a high-capacity, high speed network to be established for carrying data or information such as blueprints, words, music, medical and scientific images, movies, E-mail and the like from one location to another.

Some fundamental requirements that an all-optical transmission network should satisfy to realize the attainable benefits are as follows: First, the network must be universal in that it will accommodate an enormous diversity of applications, services, interfaces, protocols and signal formats. Second, it must be scalable in terms of the number of users, the data rate supported and the geographic span of the network. Third, to limit the cost and complexity of network nodes, the optical network must be "transparent" to high rate users so that the flow of their optical signals within the core of the network is unimpeded by optical-to-electronic transformations, even though that flow may be controlled by electronics.

A national or global network of an all-optical transmission system which meets the above noted requirements is currently needed.

SUMMARY OF THE INVENTION

This invention is directed toward a scalable, universal, wideband optical network. The disclosed network is all-optical which means that optical signals can flow between users across the network without being converted to electronic signals within the network. Thus, the network has a very wideband width and data carried by the network is unimpeded by optical-to-electronic transformations.

The network allows frequency division multiplexing to access the 25 THz (200 nm) of fiber bandwidth and can support three basic services of: A) Point-to-point or point-to-multipoint high speed circuit switched multi-Gbps digital or analog sessions; B) Time division multiplexed circuit switched sessions in the range of a few Mbps to the full channel rate of multi-Gbps; and, C) A service used internally for control, scheduling and network management that can also be used for datagram services. These services each have all-optical data paths, but can use some electronics for set up and control.

The disclosed network is scalable in the dimensions of geographic span, number of users and data rates. It includes local area networks (LANs), metropolitan area networks (MANs) and wide area networks (WANs). As the network can be scaled to hundreds of thousands of all-optical end nodes, it provides a framework for a national or global high speed communication infrastructure.

The disclosed network employs a three level hierarchy using wavelength division multiplexing (WDM). At the lowest level of the hierarchy are Level-0 networks which can be viewed as a collection of high performance local area networks. Each Level-0 network shares wavelengths internally through the use of devices such as broadcasting star couplers, splitters, combiners, buses and the like, and there is extensive reuse of wavelengths among different Level-0 networks. The intermediate level includes Level-1 networks, which can be viewed as a metropolitan area network that connects a set of Level-0 networks together and provides frequency reuse through devices such as wavelength routers. The highest level, which is a Level-2 network, can be viewed as a national or worldwide backbone that connects to the Level-1 networks with wavelength changes, wavelength routers, and/or optical switches. Optical amplifiers can be used throughout the network to combat signal losses.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Figure 1:
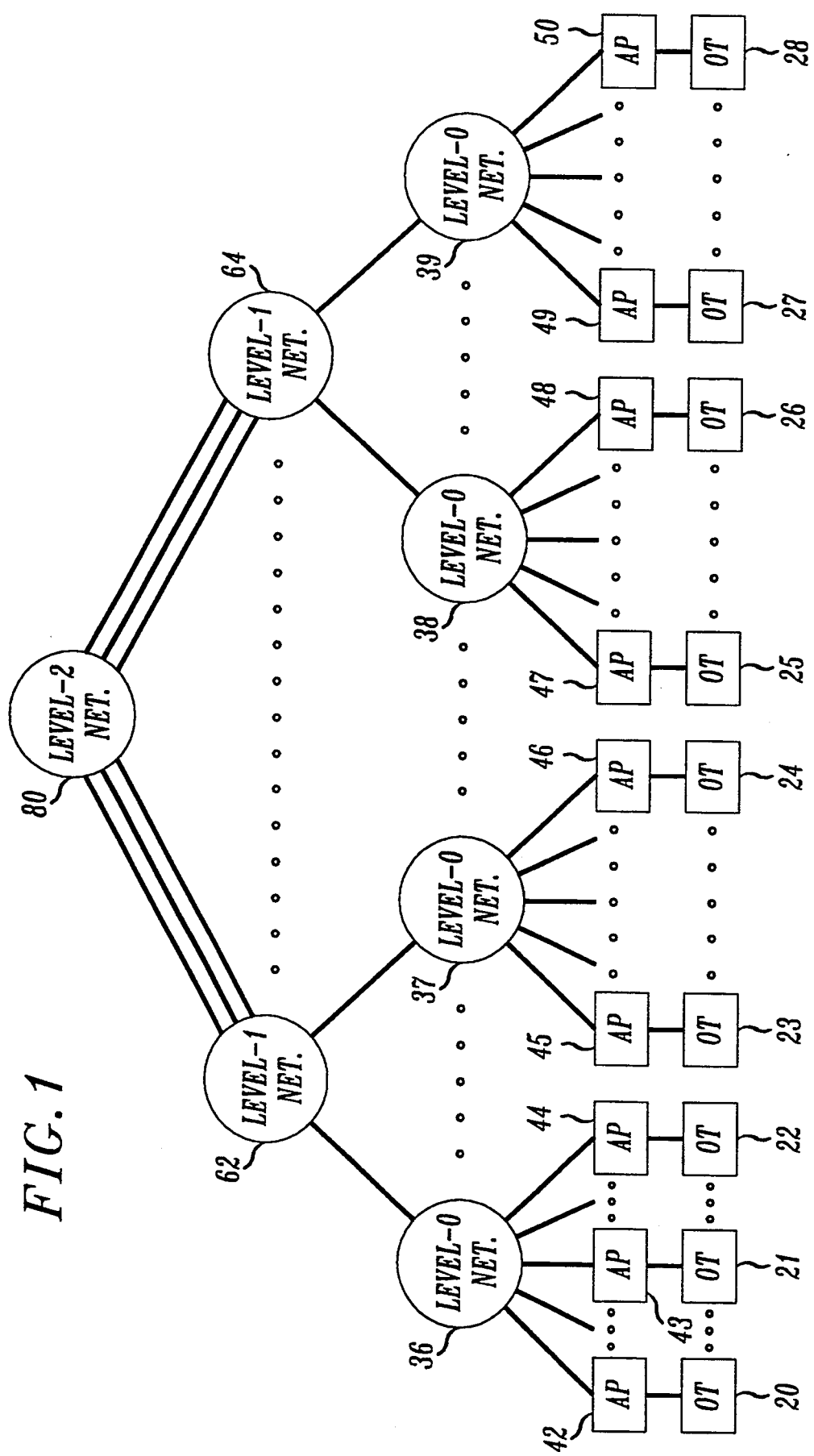
FIG. 1 is a block diagram of an all-optical network having three levels such as a Level-0, a Level-1 and a Level-2.

A need exists for a national and even a global system for a high-capacity, high-speed network for carrying information of all various types such as manufacturing blueprints, words, mathematical relationships, music, medical and scientific images, blueprints, movies and the like from one location to another.

A current network which attempts this is the Internet. It is the world's largest data network and is accessible in more than 100 countries. Information carried on the Internet provides for Data Exchange, Electronic Mail, Digital Libraries, Database Publishing, Weather Information, Electronic Communities and the like. More specifically, Electronic Mail or E-mail is when electronic messages are exchanged between users. AT&T, MCI, Compuserve, America Online and Prodigy all offer electronic mail connections to the Internet. Digital Libraries is a large library that is being assembled for access to almost everyone at a low cost. Database Publishing refers to the major commercial data bases such as Dialog and Mead Data Central that is currently available over the Internet. Weather Information refers to current weather forecasts for any city in the U.S. Additionally, hourly updated weather-satellite digital photographs can be copied from a computer at the University of Illinois. Electronic Communities refers to conferences through the computer that attract people of common interest around the world.

It is believed that more than 10 million people are connected over the Internet, which is a global network and, some estimates suggest that the number of connections to the Internet doubles each year.

But, the Internet transmits data much too slowly and is not available to all communities. Clearly, what is needed is a much faster data transmission network that reaches as many houses and businesses as today's telephone network does. One problem is that the nation's copper phone wires must be replaced with higher capacity optical fiber. This has already occurred for long distance lines, but not for local telephone lines that connect businesses and houses to the nearest switching center. Another problem is that the nation's long-distance and local telephone switches are electronic and, therefore, cannot handle the huge volume of data that must be transmitted.

All-optical networks which are based on optical amplifiers and other all-optical components and do not employ electronic regenerators are currently receiving world-wide attention. Such networks present the promise of interconnecting various users via configurable optical paths of national or even global extent to provide a large variety of flexible, broadband services which extend well beyond those services which are available with todays networks.

In this invention, the network architecture of the optical fiber transmission system is designed to receive and transmit frequency division multiplexed signals. Optical signals can flow between users across the network without being converted to electronic signals within the network. Thus, signals being transmitted within the network are not impeded by optical-to-electronic transformations. This is made possible by introducing optical amplifiers, star couplers, frequency routers, frequency converters, optical switches, and the like, into the network.

The basic architecture of the all-optical network here disclosed allows frequency division multiplexing techniques to be used to access the 25 THz (200 nm) of fiber bandwidth to be used to support basic services such as: A) point-to-point or point-to-multipoint high speed circuit switched multi-Gbps digital or analog communications; B) time division multiplexed circuit switched communications service in the range of a few Mbps to the full channel rate of multi-Gbps; and, C) a service used for control, scheduling and network management that can also be used for datagram service. Each of the services have all-optical paths but typically can use electronics for set-up and control.

The all-optical network can include local area networks (LANs), metropolitan area networks (MANs) and wide area networks (WANs). It can be expanded from a local area network up to hundreds of thousands of all-optical end nodes and, therefore, provides a framework for a national or global high speed communication infrastructure.

The benefits of accessing the tens of terahertz of bandwidth available in optical fibers are obvious. But, if these benefits are to be realized, the network must satisfy three fundamental requirements. First, the network must be universal in that it can accommodate a very large diversity of applications, services, interfaces, protocols and signal formats. Second, the network must be scalable in terms of the number of users, the data rates supported, and the geographic span of the network. Third, the wideband optical network should be transparent to high rate users so that the flow of their optical signals within the core of the network is unimpeded by optical to electronic transformations, even though that flow may be controlled by electronics.

The optical network here disclosed supports various genetic applications which includes but is not limited to the following: 1) Voice, data, images and video; 2) Wideband imagery, sensor data and scientific data transfer and discrimination; and, 3) High performance computing involving connections among supercomputers, high speed access to data bases/libraries and specialized data processing facilities.

Imagery and sensor data transfer requirements are currently in the Gbps range and are moving towards 10 Gbps per user and more in the future. In addition, multiple supercomputers performing simulations and analysis of complex phenomena will need to communicate at Gbps speeds.

While it is difficult to accurately predict the future, it is important that the all-optical transmission system be capable of operating with the applications that future network users may desire to use. To this end, while there are undoubtedly many applications that will be created, some of the various applications that are likely to be used can be classified into three categories. The first category contains applications that utilize traditional digital services. The anticipated data rates span the range from Kbps to Gbps and, therefore, it is helpful to subcategorize the first category by rate into four subgroups. The first subgroup of this category encompasses applications which require Gbps data such as ATM or other fast packet switching interconnections; un-compressed HDTV; and, visualization, simulation and supercomputer interconnects. The next subgroup contains applications in the 100 Mbps class such as local area networks (LAN's) (e.g. FDDI) interconnections, compressed HDTV, digitized conventional video and workstation interconnects. The third subgroup consists of 10 Mbps applications such as multi-channel digital audio and Ethernet class computer networks. The last subgroup contains those applications which require 1 Mbps or less such as conventional and high speed telephone service and computer/peripheral interconnects.

The second category contains analog services. This requirement may arise in the distribution of multi-channel broadcast television channels where it is advantageous to handle many channels as a single unit. The rate at which such a unit should be digitized may be so high that it is simpler and cheaper to keep it in analog form.

The third category supports user applications that require an optical interface. This may result from a very high rate, an unanticipated signaling format or a desire to use the unique characteristics of an all-optical network. Future video workstations, massive database servers and multiplexer digital HDTV sources are potential members of this category.

Finally, many future applications will need multimedia and multi-session services. The optical network architecture here disclosed addresses these needs.

The low-loss wavelength window of a single-mode optical fiber covers a bandwidth of about 25 THz (200 nm). The optical network here disclosed can use this enormous bandwidth to form a global wideband information carrying infrastructure.

The optical network architecture here disclosed is a three-level hierarchy which uses Wavelength or Frequency Division Multiplexing (WDM or FDM) and provides scalability through frequency reuse over space and the use of time division techniques. This architecture is different from simple broadcast all-optical networks that are not scalable. At the low level of the hierarchy are Level-0 all-optical networks (AON's). These all-optical networks can be viewed as a collection of high performance local area networks. Each Level-0 network shares wavelengths internally, and there is extensive reuse of wavelengths among different Level-0 networks. The intermediate level, the Level-1 network can be viewed as a metropolitan area network that connects a set of Level-0 networks and provides frequency reuse through devices such as wavelength routers. The high level, the Level-2 network, can be viewed as a national or worldwide network that connects the Level-1 networks using wavelength changers, wavelength routers and/or switches.

In the description of the invention, the term "wavelength path" is defined as being the internal network path taken by an optical signal of some wavelength traversing all or part of the all-optical network. Any passive or active device which does not either convert the optical signal to electronic form or change its optical frequency is allowed in a wavelength path. Thus, by definition, in the invention, a wavelength path can include optical amplifiers, filters, star networks, routers and the like.

The term "light path" is defined as being the path an optical signal traverses in the network from a source to a single destination perhaps including optical frequency shifters. Thus, a light path can be a simple wavelength path or can be composed of several wavelength paths interconnected by frequency shifters.

The term "light tree" is defined as a loop free connected set of branches such as, for example, a tree that is used to carry an optical signal from a source to multiple destinations. More generally, a light tree may be used in a multiaccess mode to time share optical signals from several sources and to carry the composite signal to multiple destinations. A light tree may include frequency shifters so that a light path can be considered as a special case of a light tree in which there is a single source and single destination.

The basic types of transmission services provided at the user interfaces (henceforth identified as an Access Ports (AP) of the all-optical network) are classified into three service types: Type A, which is a physical circuit service; Type B, which is scheduled time division multiplexed (TDM) service; and Type C, which is unscheduled datagram service.

More specifically, Type A service is a physical circuit switched service that uses one or more dedicated light paths from point-to-point or point-to-multipoint for the duration of a connection for transmitting information. Type-A data and modulation format are generally unrestricted, although source power levels and bandwidth specifications should not be exceeded at the AP. At connection establishment time, the modulation and data formats are made available to the destination to ensure that the data is properly recovered.

Connections for type-A service are normally obtained as a result of a request through an AP by a sending node. However, other mechanisms are permissible, such as a third-party request or permanent connections specified via network management. There are several subtypes of connections that can be associated with this service. These are: A) Duplex connection—This bi-directional point-to-point connection might be the most commonly requested Type-A service. This type of connection makes use of two dedicated light-paths in the all-optical network. Such a connection can have a number of uses such as a dedicated channel for use by a very high speed computer-computer guaranteed-bandwidth channel or by a traditional electronic packet or ATM cell switching system. B) Multicast connection—With this connection, the requesting node utilizes a single light-tree to the destination(s) for the purpose of unidirectional transmission. There may be one or more receivers associated with this type of connection which may be used for very high speed telemetry or uncompressed HDTV respectively. When this service type is requested, the requester also specifies whether it intends to be a source or a destination. C) Shared connection—With this type of service, each participating node may transmit and receive each transmission on a single dedicated light-tree. Individual contention algorithms can be agreed upon by the users sharing the connection to suit their applications.

Type-A service can be implemented with tunable lasers having a wide tuning range, narrow linewidth, and good frequency stability, repeatability, and sensitivity; and with devices that allow frequency re-use such as: static and dynamic wavelength routers.

Type-B service is a "scheduled TDM" service that uses a light-path or light-tree that is time-slotted to transmit information for the duration of a connection. In general, data and modulation formats within a scheduled time-slot are unrestricted although they are specified at connection setup to ensure that the receiver properly recovers the signal. With Type-B service, as with Type-A, Duplex, Multicast, and Shared subtypes are available.

The architecture here disclosed adapts well to multiple simultaneous network connections at an Access Port. For example, each access port can be connected to one or more optical terminals (OTs) each having one or more receivers. This allows a receiver to be dedicated to a network connection for the period of that connection. Another important reason for Type-B service is to more efficiently share light-paths. If each Type-B service connection requires a dedicated light-path, the all-optical network would quickly run out of this valuable resource.

While it is likely that some OTs will require multiple receivers and transmitters for the aggregate data throughput or for the reduced blocking probability that they can provide, many OTs will not need more than one set of optical transceivers except for an always available control channel. These same OTs, though, will likely need to have many simultaneous connections. Therefore, sharing is needed. In the architecture disclosed, each receiver and transmitter is multiplexed over time and wavelength according to a schedule which permits each OT to have a number of simultaneous connections while not interfering with other connections to which it is not a party.

The slot duration should be large, of the order of 10 $\mu s$, relative to such effects as laser tuning time, AGC stabilization time, clock recovery stabilization, word and frame synchronization, and the like. Similarly, the frame delay should be small relative to tolerable end-to-end delay. It appears that on the order of 100 slots per frame is reasonable within these constraints.

For Type-B service, the issue of call blocking due to a lack of common time slots between the transmitter and the receiver may occur. However, with a reasonable number of slots per frame (for example, approximately 100), blocking probabilities should not present much difficulty. If this is a problem, then the time slots can be rearranged to further improve the situation at a cost of added complexity. Type-B service can be implemented with fast tuning lasers, fast tuning coherent or direct-detection receivers and fast AGC, clock recovery and bit and word synchronization techniques.

Type C service is an "unscheduled datagram" service under which OTs may transmit a "packet of information" in a specified data and modulation format on a "well known" wavelength. The media-access-control (MAC) protocol can be based on a distributed algorithm (e.g., ALOHA) and will not require a central resource or central timing since the C-service will be used to auto-configure the network. Network management scheduling and control messages also use Type-C service. Datagrams which are for "remote" OTs may be forwarded by adjunct electronic servers.

In addition to the services which have been described, there are other types of services which may be offered "on top" of the all-optical network. These services are provided by electronic means at a level above the all-optical network. As such, these services simply build upon the network services described above. An example of such a service might be a high speed packet switching or ATM cell switching service constructed with electronic nodes using either Type-A or Type-B channels.

Referring to FIG. 1, there is illustrated a three level all-optical network (AON). Optical terminals (OT) 20-28 are user devices that attach to the network via Access Port (AP) interfaces. The optical terminals generally are connected to Level-0 networks 36,37,38,39 of the network and are the users of the all-optical network services. The OT are user devices that attach to the all-optical network through access port interfaces 42-50. The optical terminals 20-28 are normally electro-optic devices which initiate and receive data from the all-optical network. The optical terminals conform to the protocols specified by the all-optical network architecture when communicating over the access ports 42-50. Not all of the optical terminals 20-28 support all of the transmission services described above. However, all of the optical terminals must support Type-C service for network management and control messages. A specific optical terminal may also support Type-A and/or Type-B services.

An Access Port (AP) is essentially an interface to the all-optical network and uses a pair of single-mode fibers; one for input and the other for output. It is to be noted that a single fiber can be used in a duplex mode to carry both directions of the traffic. However, the use of two fibers appears simpler, at least conceptionally. Thus, the Access Port is an optical interface having defined parameters for wavelength, laser linewidth, chirp, frequency stability, maximum power, maximum bandwidth dynamic range and the like.

Associated with each optical terminal in the network is one or more names and an associated network layer address such as, for example, an internet address. The name for each optical terminal may be an internet domain name and the mapping between a name and the address can be performed by a mechanism such as the Domain Name Service. In addition, each optical terminal has one all-optical network address for each access port on that optical terminal. Some optical terminals may use multiple access ports and will, therefore, have multiple network addresses. The network address associated with each access port is a hierarchical one with parts of the address having topological significance. In addition, one segment of this hierarchical address will be globally unique such as, for example, the IEEE 802 48 bit unique identification for the purpose of tie-breaking in distributed election protocols. The mapping between network layer address and the all-optical network address is performed by traditional mechanisms similar to the Address Resolution Protocol (ARP) or the OSI ES-IS protocol.

Figure 2:
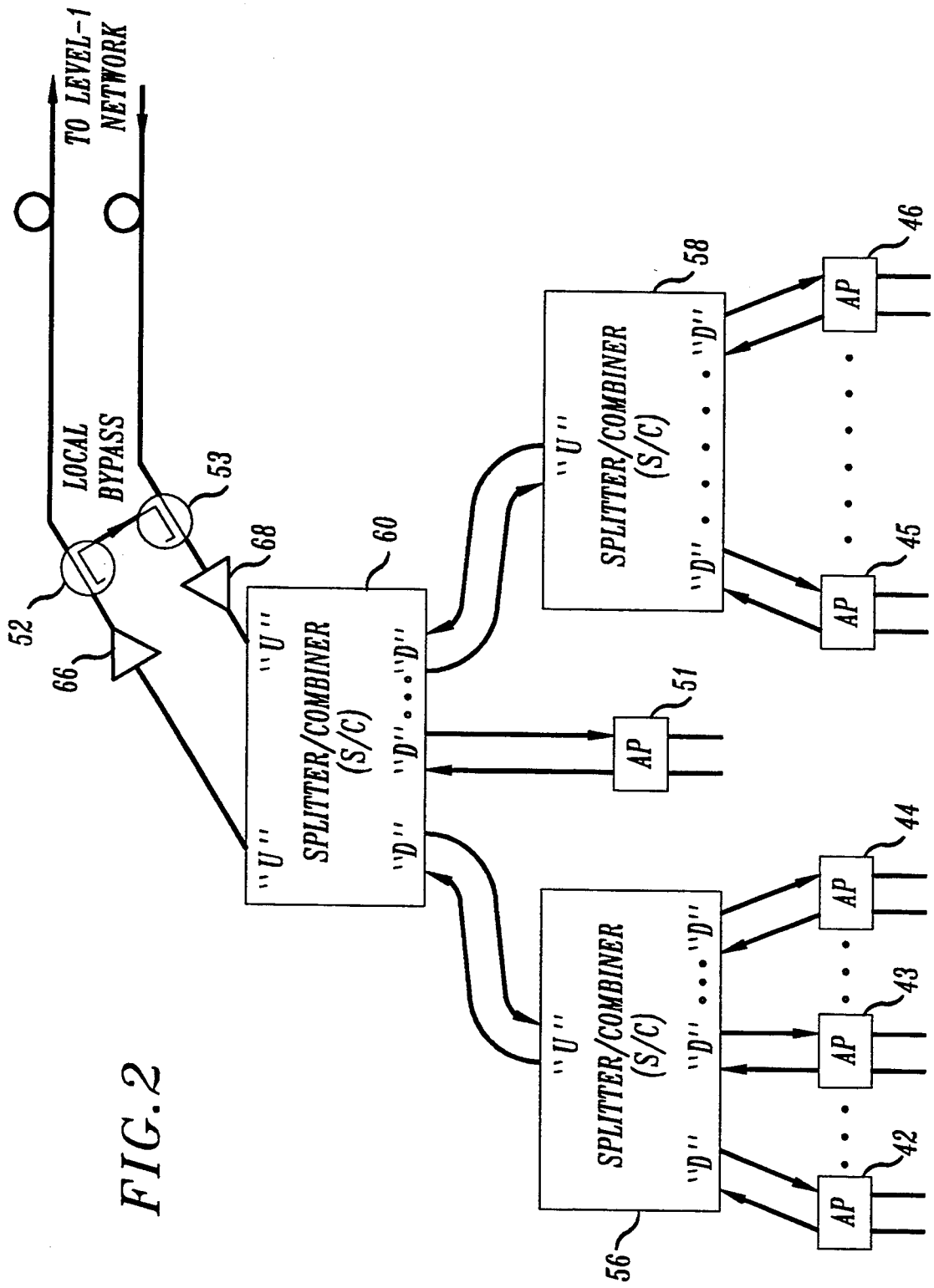
FIG. 2 is a block diagram of an embodiment of Level-0 of the all-optical network of FIG. 1.

The Level-0 networks 36-39 are the lowest level networks in the all-optical network architecture each consisting of a "local" broadcast network which has a bypass means which blocks all but at least one wavelength signal from being transmitted to a location remote from the local broadcast network. Referring to FIG. 2, there is illustrated a block diagram of a "local" Level-0 network. In general, optical terminals 20, 21, 22 are connected to a local Level-0 network. More specifically, the local area network can be a broadcasting star or a bus where each access port 40,43,44 can "hear" everything that is transmitted by other optical terminals in the same Level-0 network on the local wavelength for the Level-0 networks. The local wavelengths are wavelengths that are used for local traffic within the same Level-0 network of the all-optical network and are blocked from leaving the Level-0 network by a frequency-selective local bypass 52, 53. These wavelengths may be re-used in the Level-2 networks of the all-optical network, and in all the other Level-0 networks. A preferred embodiment of the Level-0 network, for example, Level-0 network 36 of FIG. 1, which is more specifically illustrated in FIG. 2, has a spanning-tree physical topology and uses building blocks referred to as splitter/combiners 56, 58 connected to a root splitter/combiner 60. Each splitter/combiner (S/C) supports Up (U) ports and Down (D) ports. The U ports of the root S/C 60 are connected to the next higher level of the all-optical network, the Level-1 networks 62,64 (see FIG. 1). The D ports of the S/C's 56,58 are connected to access ports 42,43,44,45,46. The "D" ports of the root S/C 60 are connected to the U ports of the S/C's 56,58 and can be connected directly to access port 51. The U ports of the root S/C 60 are connected via optical amplifiers 66,68 and frequency selective couplers 52,53 to Level-1 networks 62,64. With this arrangement, a single Level-0 network can support approximately 1000 stations. The frequency-selective local bypass 52,53 which is used at the U ports of the root S/C 60 couples the local wavelengths from the root S/C back to the Level 0 networks 56,58 and, in addition, prevents them from entering the next higher Level-1 networks. The "U" ports of the root S/C 60 are used to connect to the next higher layer of the all-optical network, the Level-1 network 80.

Figure 3:
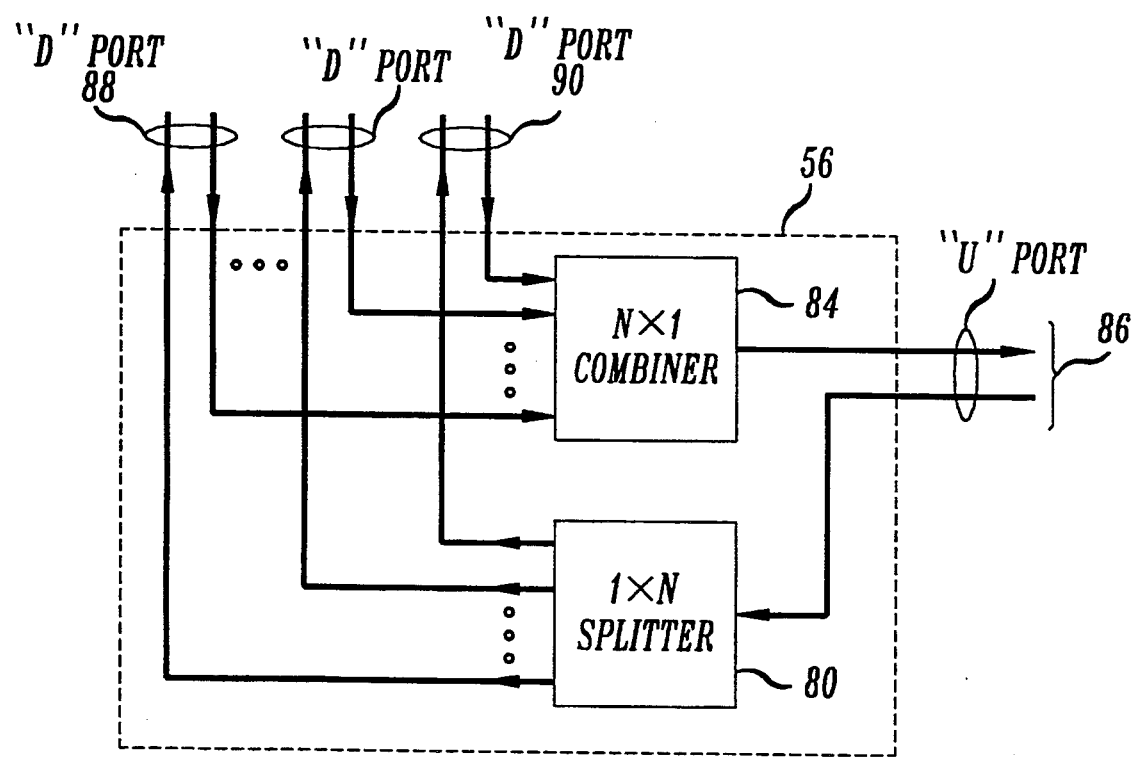
FIG. 3 is a detailed block diagram of a splitter/combiner.

Referring to FIG. 3, there is illustrated a splitter/combiner 56 built from a 1×N splitter 80 and an N×1 combiner 84. Each S/C has two types of ports, a single U port 86 which is used to make connections in the direction of the root of the spanning tree; and, multiple D ports 88 . . . 90 which provide access ports for Optical Terminals as well as other S/C devices further from the root. The wavelength-selective local bypass (52,53 of FIG. 2) redirects back virtually all of the energy within its band to eliminate multipaths that might arise from loops in the Level-1 networks.

Positioning the frequency-selective bypass at this location provides three advantages. First, it limits the physical length (and hence the delay) of the light-path when two optical terminals of the same local Level-0 network are communicating. Second, it improves the availability of the all-optical network to the OTs because it allows intra Level-0 communication; even when the Level-0 to Level-1 path has failed. Finally, it allows those frequencies that are blocked from entering the Level-1 networks to be re-used elsewhere in the all-optical network.

The tree-of-stars topology is chosen because of its operational and installation advantages. However, the Level-0 networks can also be constructed using a bus architecture, which has some natural contention-resolution advantages.

At Level 0, the optical wavelengths used to provide the Type A, B and C services are divided into two groups referred to as "L0" wavelengths and "L1" wavelengths. L0 wavelengths are used for local traffic within the same local Level-0 network and are blocked from leaving the local Level-0 network by the frequency selective local bypass. These wavelengths may be re-used in the Level-2 networks of the all-optical network, and in all of the other local Level-0 networks. L1 wavelengths are used for communicating among local Level-0 networks connected to the same Level-1 network of the all-optical network. Some of the wavelengths in this group may also be used for inter Level-1 communication.

Each local Level-0 network 36 . . . 39 has a scheduler agent which is a controlling computer operating with a software program that handles requests for allocating wavelength and time slot resources among the different access ports 42 . . . 50. The scheduling agent may be implemented in a dedicated node attached to the local Level-0 network or may be implemented in one of the Optical Terminals connected to a local Level-0 network.

Each local Level-0 network can be administered by a single entity such as a company, a corporation, a university or the like. As such, some of the privacy difficulties associated with broadcast media are alleviated. Further, the Level-0 scheduling agent may also enforce management security policies. Privacy issues that arise from intra or inter Level-0 communications can be resolved by encryption performed by the OTs or at the source of the information.

Figure 4:
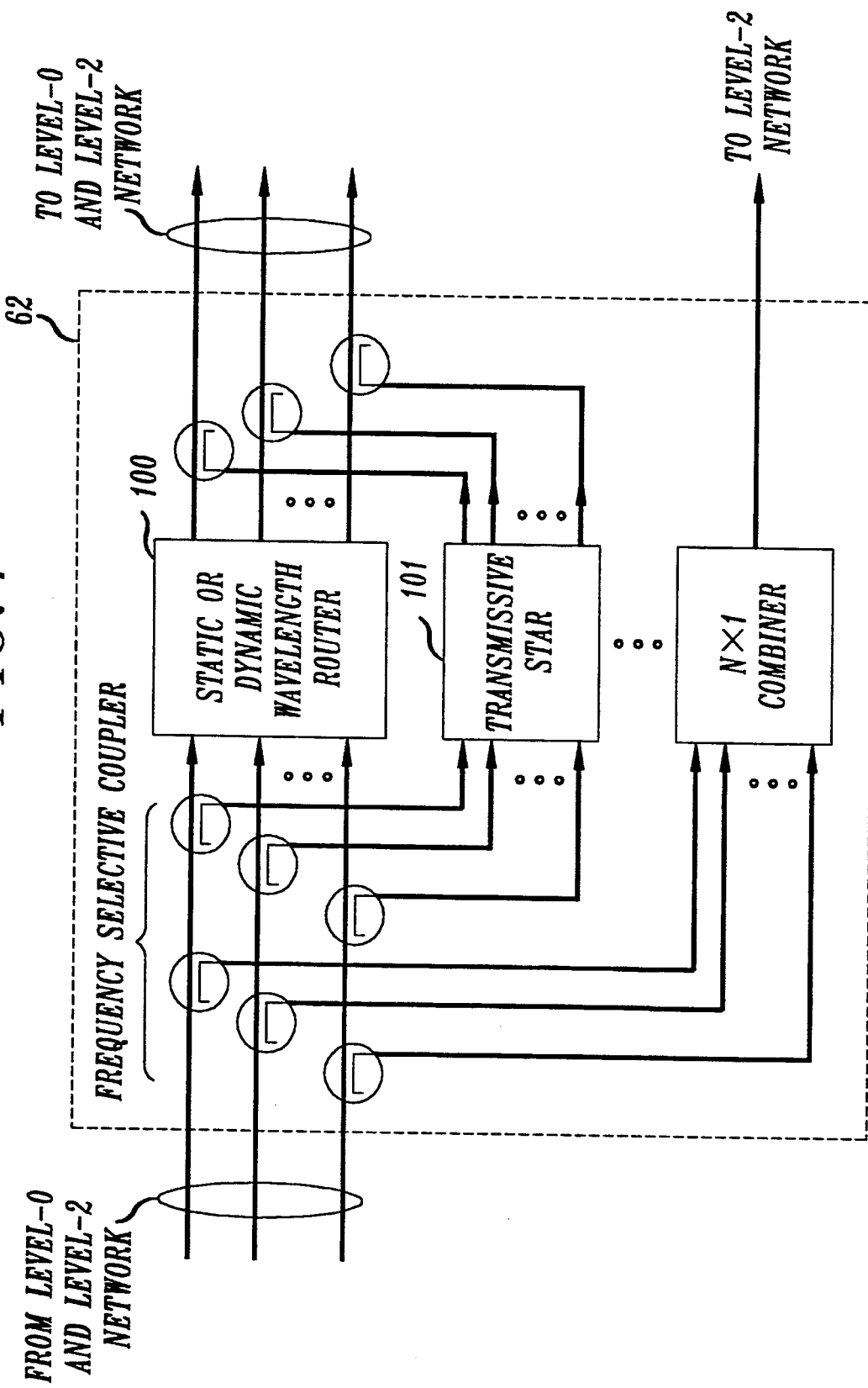
FIG. 4 is a block diagram of a Level-1 of the all-optical network of FIG. 1.

Level-1 networks 62,64 are first or intermediate level wavelength routing networks that route L1 wavelengths from one Level-0 network to another. Wavelengths may be routed in groups or individually. A Level-1 network is illustrated in FIG. 4. Essentially, a level-1 network is either a static or dynamic wavelength router 100 with one or more broadcasting stars 101. The purpose of the Level-1 network is to provide a wavelength path or light tree to one or more directly connected local Level-0 network or, in combination with a Level-2 network, a light-path or light-tree to one or more local Level-0 networks outside itself.

Figure 5:
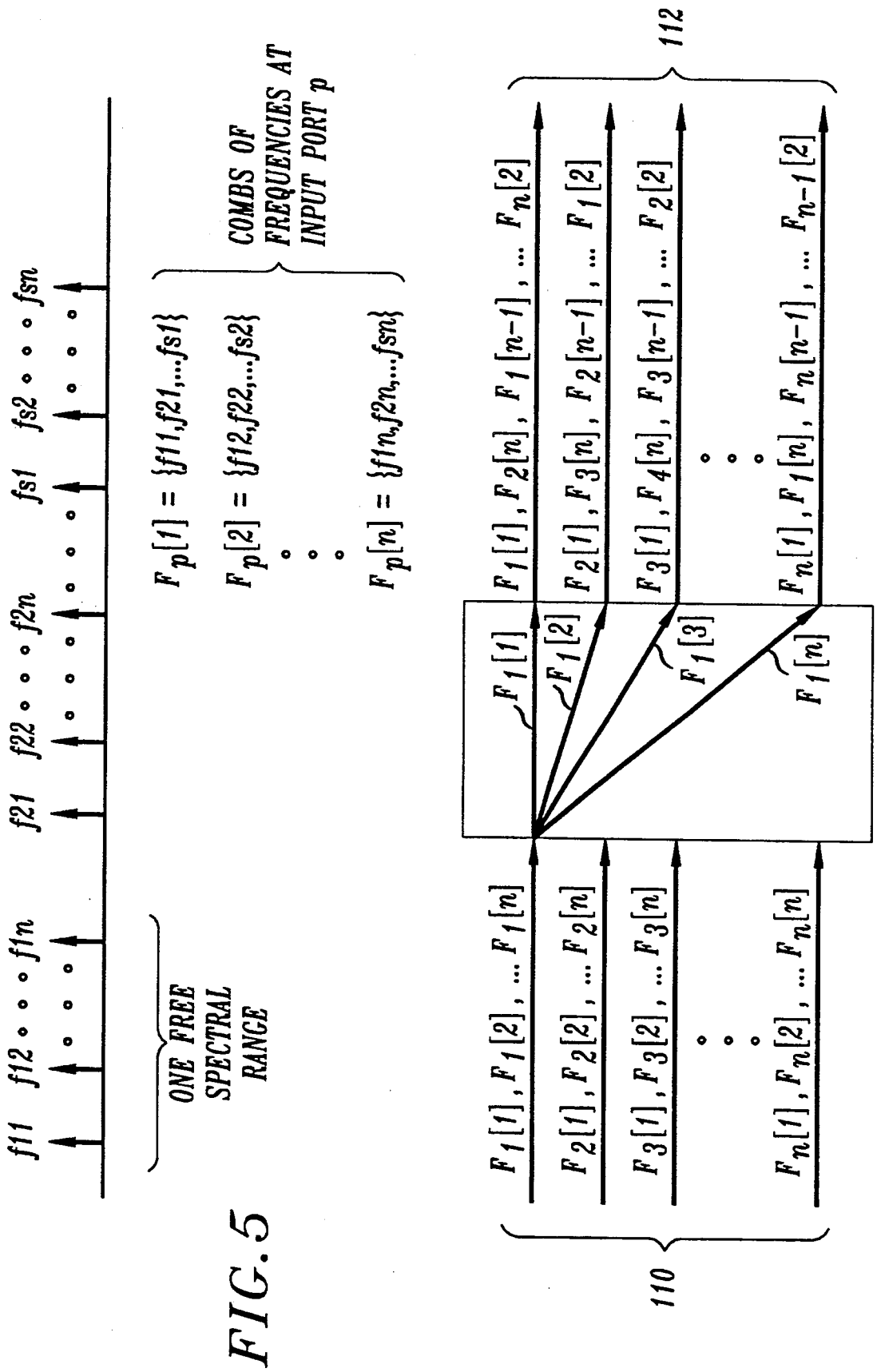
FIG. 5 is an operational diagram of a static wavelength router.

The static wavelength router 100 separates the wavelengths of a received signal of many wavelengths. Referring to FIG. 5, there is illustrated a diagram of the operation of a static wavelength router. With an N×N static wavelength router, full connectivity is provided from each input port 110 to every output port 112. As received from an input port, the selection of an output port is made by the choice of wavelength used. Clearly, since multiple wavelengths may be used on each fiber, multiple simultaneous wavelength paths exist from each input fiber. The wavelength routing properties of this device are periodic in two ways. First, the spacing between frequencies for each output selection are equal and second, multiple free spectral ranges exist in the device so that the optical muting property also repeats. And, this is accomplished without power splitting loss as would be encountered in a broadcasting star. In FIG. 5, n equals the number of frequencies per free spectral range which is equal to the number of input and output ports; and S equals the number of free spectral ranges accessed.

If the router has n input and n output ports, and if the number of available optical frequencies or wavelengths is $r = S \times n$, then use can be made of S free-spectral ranges, where each has n frequencies. Thus, the number of simultaneous wavelength paths, w, through the router is $w = n \times r = s \times n^2$. Obviously, when $n = 25$ and $r = 100$, w will be 2500; and when the input and output ports $n = 100$ and the wavelength $r = 500$ the number of simultaneous wavelength paths w will equal 50,000.

Figure 6:
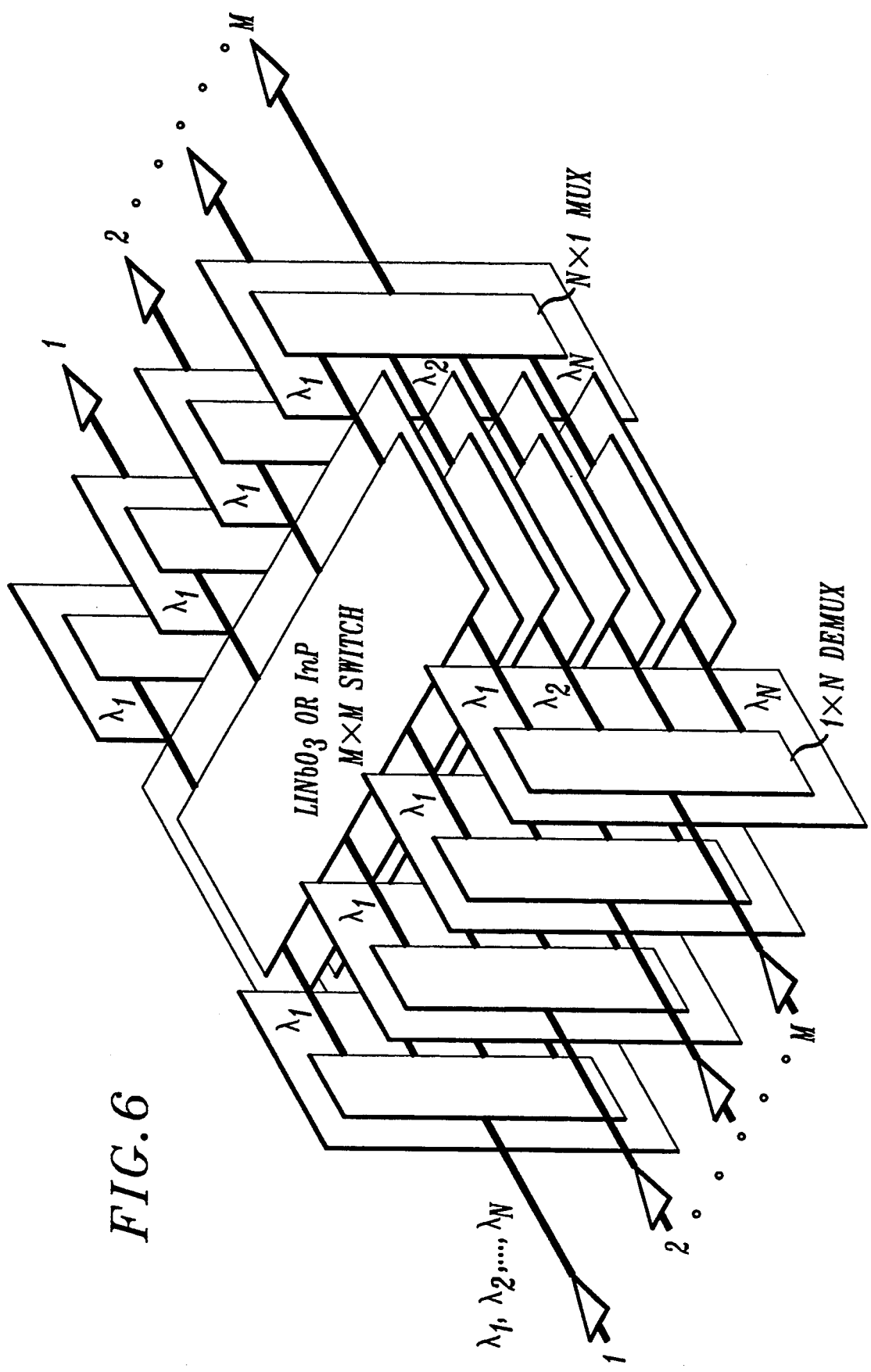
FIG. 6 is a perspective view of a dynamic wavelength router.

The static wavelength router performs best when the traffic matrix is uniform. However, when the traffic matrix is non-uniform, then a dynamically reconfigurable device such as is illustrated in FIG. 6 can be used. The device of FIG. 6 is a generalization of the static wavelength router and allows more than one wavelength from each free spectral range to be routed to the same output through N×N spatial switches.

As is illustrated in FIG. 6, a dynamic wavelength router uses multiple LiNbO$_3$ spatial optical switches e.g., made of LiNbO$_3$ or IP switching elements. This dynamic wavelength router can eliminate the need for optical frequency changers at the interface between the Level-1 and Level-2 networks, or within the Level-2 networks. It is to be noted, however, that the presence of frequency changers can add flexibility to the system.

The optical bypass star 101 in FIG. 4 is there for two reasons. First, it allows significant improvement in the utilization of network resources by allowing a single light tree to be shared for Type B service by more than one local Level-0 network. Second, it allows multiple light tree branches at Level-1 for the purpose of providing multicast service.

As with each local level-0 network, a scheduler agent is also associated with each Level-1 network. The Level-1 scheduler agents work with their Level-0 scheduler agents to allocate wavelength paths to users who request connections from one Level-0 network to another from the same Level-1 network or from a Level-0 network to the boundary of the Level-2 network. The Level-1 scheduler agent communicates directly with the scheduler agents of attached Level-0 networks by using Type-C service over the bypass star 101 of FIG. 4 and with peer Level-1 scheduler agents over the Level-2 network. Normally, Level-1 networks require service from a Level-2 network to transmit information from a locally attached Level-0 network to a Level-0 network connected to a different Level-1 network.

Figure 7:
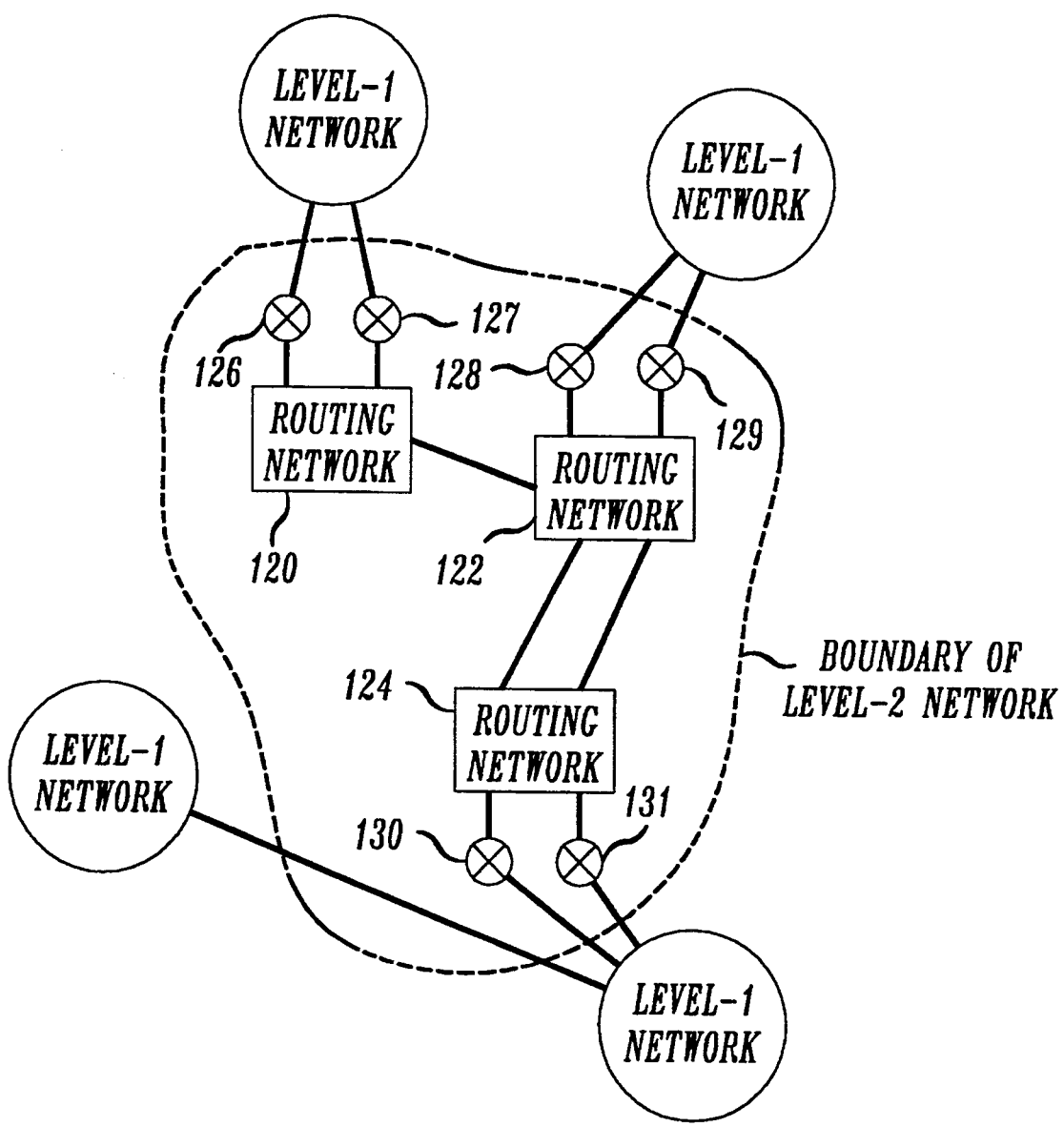
FIG. 7 is a block diagram of a Level-2 network.

Referring to FIG. 7, the Level-2 network can consist of simple fiber trunks; routing networks 120 . . . 124 which can be static or dynamic wavelength routers and/or optical switches; and dynamic frequency changing devices 126 . . . 131.

While the routing and frequency changing devices are generally dynamically controllable devices which, under electronic control, change the route or the frequency of the input optical signals, for simplicity the reconfiguration of these devices can be on a timescale that is long relative to the Type-B service slot time.

The ability to arbitrarily change frequencies in the Level-2 network effectively decouples the Level-1 schedulers from the need to have global knowledge of all wavelength assignments when locating a light path. This not only places fewer constraints on the scheduling computations, but also provides the network with better scaling properties.

The Level-2 network contains the long haul optical fibers which are used to connect various cities. These long haul fibers are very valuable resources and must be used efficiently for the network to be viable. To do this, there is one or more scheduler agent associated with the Level-2 network. The scheduler agents of a Level-2 network cooperate with the scheduler agents of the Level-1 networks and other scheduler agents of the Level-2 network to allocate light paths from the boundary of one Level-1 network to the boundary of another Level-1 network. Referring to FIG. 7, it is to be noted that there is no full direct connectivity between all of the Level-1 networks. Full logical connectivity is provided by the establishment of an indirect light path, when necessary, by utilizing other routing networks. In some instances it may be desirable to connect some Level-1 networks directly to other Level-1 networks via fiber/amplifier paths. In these instances, these fiber paths are managed by the Level-2 scheduler and, therefore, can be viewed as being part of the Level-2 network.

Within each Level-0 network, there exists one or more optical terminals (OTs), each of which is capable of acting as a scheduler agent. If more than one OT is capable of acting as a scheduler agent, then they execute a distributed algorithm to elect only one to be the active scheduling agent. In the event of a scheduler failure, the distributed election algorithm is again executed. Once elected, the scheduler agent is responsible for a number of primary functions that can include: 1) Acting as an agent for authenticating, authorizing and servicing requests for type A, B and C connections from Access Ports (AP's) in its Level-0 network; 2) Distributing and collecting timing information necessary to establish Type-B connections; 3) Maintaining an accurate schedule for all the wavelengths for which it is responsible. This includes updating the schedule when connections are made or terminated and when resources are recovered when an AP fails. 4) Communicating with its Level-1 scheduler agent. 5) Controlling any tunable wavelength selective couplers. 6) Enforcing management policies such as applying authentication and authorization controls to connection requests. 7) Collecting accounting information, and; 8) Performing possible ancillary functions such as a name to address mapping service.

A schedule is maintained for each wavelength. The schedule is essentially a data structure used to maintain all the state information required for controlling and allocating that wavelength. The contents of the data structure are dependent on the type of service to which the wavelength is allocated. For example, for a Type-A service, the source and destination addresses, and time allocated, would be maintained. For a wavelength allocated to Type-B service, the schedule is a list of connections on that wavelength together with the source/destination of each, as well as the list of time slots allocated to that connection.

Communication between access ports and their associated scheduler agent takes place on a known wavelength using a Type-C service and a known address for the scheduler agent. Upon power up, each Access port registers with the scheduler agent. This does not require prior knowledge of the state of the system and permits complete automatic self-configuration.

For Level-1 scheduling, the selection and primary responsibilities of the Level-1 scheduler agent parallels that of the Level-0 scheduler. In addition, the Level-1 scheduler must do the following: 1) Authenticate, authorize and satisfy requests for inter Level-0 and inter Level-1 connections. Inter Level-0 requests may be satisfied without resort to the aid of the Level-1 scheduler. 2) Provide a matchmaker function to establish a wavelength path from one of its constituent Level-0 networks to another. 3) Establish multicast connections using the frequency-selective coupler/star. 4) Communicate with its Level-2 scheduler to allocate light-paths as required. 5) Provide timing information to its Level-0 networks for the purpose of arranging Type-B connections.

Referring to the Level-2 scheduling; the selection and primary responsibilities of this scheduler parallel that of the Level-0 and Level-1 schedulers and, in addition, the Level-2 scheduler must 1) authenticate, authorize and satisfy requests for inter Level-1 connections. This is done by finding free wavelength paths which are within the Level-0 network and between the two appropriate Level-1 networks, and then using wavelength changing devices and wavelength routers to provide an end-to-end light path over these wavelength paths.

In the telecommunication area, by convention, the optical terminals (OT's) can use a known wavelength, for example, via Aloha to communicate connection requests to the scheduler. Connection requests include the type of requested service, the address of the requested OT, the requested throughput and the priority.

Upon receiving a connection request, the scheduler also determines if the destination is in its Level-0 network. If so, it determines if the necessary resources, the light path and sufficient common time slots, are available and, if they are, then it informs the requested OT's of the new connection request. If the destination subsequently accepts the connection, then the requesting OT is reliably informed and communication may begin.

If, however, the destination is on a different Level-0 network, but in the same Level-1 network, then the Level-0 scheduler communicates with its Level-1 scheduler to select a wavelength which provides the wavelength path between its own Level-0 network and the other Level-0 network. It is to be noted that for a Type-B connection request, a light-path may already exist and therefore only the time slot(s) need to be established. If there are insufficient time slots for the required bandwidth, another wavelength path may be established.

If the destination is not in the same Level-1 network, then the Level-0 scheduler communicates with its Level-1 scheduler to find a light-path, which may require wavelength changing using a locally available wavelength. Once a light-path is established, the connection process is completed as described above.

For Type-B service requests, in addition to a light-path, available time slots in the source and destination must be identified and allocated. A timing distribution and slot matching scheme which either requires or does not require a universal time source can be used to allow the OT's in the same level to share a light-path for Type-B service.

This timing distribution and slot matching scheme is highly desirable and is alternative approach which uses Global Positioning System (GPS) receivers to provide precise (~100 ns) time synchronization of each scheduler. Such precise global time synchronization will permit the direct measurement of the propagation delay from any OT to any other at connection setup time. Once known, these propagation delays may be compensated for by adjusting the transmit time appropriately.

During operation, a communications path can be established A) Between optical ports (Referring to FIG. 1) 42 and 44 which are connected to the same broadcasting local area network; a Level-0 local area network; or B) between optical ports 42 and 46 which are in the same MAN, Level-1, but not in the same LAN; or C) between optical ports 42 and 48, optical ports which are not in the same MAN.

To establish a communication path between optical ports 42 and 44;
1) Optical port 42 sends a request to the scheduler agent of the Level-0 (LAN) network 36;
2) Scheduler agent sends back a signal which identifies which local wavelength is available, and whether port 44 is busy or not. If port 44 is not busy, then the scheduler agent also notifies port 44 of the request.
3) Port 42 tunes its transmitter (laser) to the available local wavelength, and this wavelength is then broadcast to all ports connected to the Level-0 (LAN) network 36, but this wavelength signal does not go to Level-1 network 62 because of the local bypass.
4) Port 44 tunes its receiver to the same wavelength and a communication path is established.

To establish a communication path between optical ports 42 and 46;
1) Optical port 42 communicates with the scheduler agent of its Level-0 network 36, which in turn communicates with the scheduler agent of the destination Level-0 network 37 which informs port 46 of the request and determines if port 46 is available. This can be done through the scheduler agent of Level-1 network 62.
2) Port 42 is notified by its scheduler agent of which Level-1 wavelength is available for use, and the Level-1 router directs the optical signal to the destination port 46 of Level-0 network 37.
3) Port 42 tunes its transmitter to the assigned wavelength, which is then transmitted from the first Level-0 network 36, passed the local bypass, through the Level-1 router, and then to all of the ports of the destination Level-0 network 37. No frequency conversion takes place.
4) Port 46 tunes its receiver to that wavelength and communication is established.

To establish a communication path between optical ports 42 and 48;
1) After port 42 makes its request, the scheduler agents in its Level-0 network, its Level-1 network, the Level-2 network; the destination Level-1 network and the destination Level-0 network all cooperate to find an optical path (a light path) from port 42 to port 48. Specifying the lightpath involves specifying the transmitted wavelength, the receiving wavelength, and any intermediate wavelength, if required, within Level-2.
2) Port 42 tunes its transmitter to the desired transmitting wavelength. The signal goes from Level-0 network 36, through Level-1 network 62 router to some point in Level-2 network 80. The frequency may be changed on the way from Level-1 network 62 to Level-2 network 80, or within Level-2 network 80.
3) Level-2 scheduler agent establishes the path from the source Level-1 network 62 to the destination Level-1 network 64. This is done by configuring optical switches, dynamic routers and/or frequency changes within Level-2 network 80.
4) Level-2 network 80 delivers the signal to the destination Level-1 network 64 and, if required, changes its frequency to the appropriate intermediate-routing and/or reception frequency. This is done within the Level-2 network 80, or between the Level-2 network 80 and the destination Level-0 network 38.
5) The signal goes from Level-2 network 80, through the router of the destination Level-1 network 64, and finally, because it is of the correct frequency, is routed to the destination Level-0 network 38.
6) As noted above, port 48 tunes its transmitter to the correct wavelength and the communication path is established.

It will thus be appreciated that those skilled in the art will be able to devise numerous arrangements which, although not explicitly shown or described herein, embody the principles of the inventions. Accordingly, all such alternatives, modifications and variations which fall within the spirit and broad scope of the appended claims will be embraced by the principles of the invention.

We claim:
1. A network comprising
a first all-optical broadcasting local area network having down access ports and at least one up access port,
a first optical terminal coupled to a first one of the down access ports for sending/receiving optical signals having at least one wavelength component, a second optical terminal coupled to a second one of the down access ports for sending/receiving optical signals having at least one wavelength component, a third optical terminal coupled to a third one of the down access ports for sending/receiving optical signals having at least one wavelength component, said optical terminals include optical transmitters and optical receivers for transmitting and receiving, respectively, optical signals, means coupled to the optical terminals to tune a transmitter at one of the optical terminals and a receiver at another of the optical terminals to a selected wavelength, and local bypass means coupled to the up access port to block all but at least one wavelength component of an optical signal from being transmitted from the first all-optical broadcasting local area network.

2. The network of claim 1 wherein the all-optical broadcasting network comprises a broadcasting star coupler.

3. The network of claim 1 wherein at least one of the optical terminals is tunable.

4. The network of claim 1 wherein the all-optical broadcasting network comprises a bus optically connected to said optical terminals and said local bypass means.

5. The network of claim 1 wherein the all-optical broadcasting network comprises a splitter/combiner optically connected to said optical terminals and said local bypass means.

6. The network of claim 1 wherein said first all-optical broadcasting local area network comprises a first splitter/combiner having down access ports and at least one up access port, a second splitter/combiner having down access ports and at least one up access port, and a third splitter/combiner having down access ports and at least one up access port, the down access ports of the third splitter/combiner being coupled to the up access ports of the first and second splitters/combiners, and the up access port of the third splitter/combiner being coupled to the local bypass means for receiving or sending at least one selected optical signal.

7. The network of claim 6 further comprising a fourth optical terminal coupled to a down access port of the third splitter/combiner.

8. The network of claim 6 further comprising a second all-optical broadcasting local area network having down access ports and at least one up access port, a fourth optical terminal coupled to a first one of the down access ports of the second broadcasting local area network for sending/receiving optical signals, a fifth optical terminal coupled to a second one of the down access ports of the second broadcasting local area network for sending/receiving optical signals, the optical terminals include optical transmitters and optical receivers for transmitting and receiving, respectively, optical signals, a second local bypass means coupled to the up access port of the second all-optical local area network to block all but at least one wavelength component of the optical signal from a transmitter from being transmitted from the second all-optical local area network; and wavelength router means coupled to pass signals of specifiable wavelengths between the first and second local bypass means.

9. The network of claim 8 wherein said second all-optical broadcasting local area network comprises a fourth splitter/combiner having down access ports and at least one up access port, a fifth splitter/combiner having down access ports and at least one up access port, a sixth splitter/combiner having down access ports and at least one up access port, the down access ports of the sixth splitter/combiner being coupled to the up access ports of the first and second splitter combiners, and wavelength router means coupled to the first and second local bypass means to pass optical signals of specifiable wavelengths between the up access ports of the third splitter/combiner of the first and the sixth splitter/combiners of the second all-optical broadcasting local area network.

10. The network of claim 9 wherein the wavelength router means is a static wavelength router means.

11. The network of claim 9 wherein the wavelength router means is a dynamic wavelength router means.

12. The network of claim 1 further comprising a second all-optical broadcasting local area network having down access ports and at least one up access port, a fourth optical terminal coupled to a first one of the down access ports of the second local area network for sending/receiving optical signals, a fifth optical terminal coupled to a second one of the down access ports of the second local area network for sending/receiving optical signals, local bypass means coupled to the up access port to block all but at least one optical signal from being transmitted from the second all-optical broadcasting local area network, first wavelength router means coupled to pass optical signals of specifiable wavelengths between the local bypass means of the first and second all-optical broadcasting local area networks, a third all-optical broadcasting local area network having down access ports and at least one up access port, a sixth optical terminal coupled to a first one of the down access ports of the third local area network for sending/receiving optical signals, a seventh optical terminal coupled to a second one of the down access ports of the third local area network for sending/receiving optical signals, local bypass means coupled to the up access port to block all but at least one wavelength component of an optical signal from being transmitted from the third all-optical broadcasting local area network, a fourth all-optical broadcasting local area network having down access ports and at least one up access port, an eighth optical terminal coupled to a first one of the down access ports of the fourth local area network for sending/receiving optical signals, a ninth optical terminal coupled to a second one of the down access ports of the third local area network for sending/receiving optical signals, local bypass means coupled to the up access port to block all but at least one optical signal from being transmitted from the fourth all-optical broadcasting local area network;

second wavelength router means coupled to pass-optical signals of specifiable wavelengths between the local bypass means of the third and fourth all-optical broadcasting local area networks, and connect means coupled to provide light paths between the first and second wavelength router means.

13. The network of claim 12 wherein
the first wavelength router is coupled to a first broadcasting star coupler, and the second wavelength router is coupled to a second broadcasting star coupler.

14. The network of claim 13 wherein the connect means comprises optical fibers.

15. The network of claim 14 further comprising wavelength changers coupled to the optical fibers.

16. The network of claim 14 further comprising wavelength routers coupled to the optical fibers.

17. The network of claim 14 further comprising optical switches coupled to the optical fibers.

18. The network of claim 14 further comprising wavelength routers and wavelength changers coupled to the optical fibers.

19. The network of claim 14 further comprising wavelength routers and optical switches coupled to the optical fibers.

20. The network of claim 14 further comprising wavelength changers and optical switches coupled to the optical fibers.

21. The network of claim 14 further comprising wavelength changers, wavelength routers and optical switches coupled to the optical fibers.

22. The network of claim 16, 18 or 19 wherein the wavelength routers are static wavelength routers.

23. The network of claim 16, 18 or 19 wherein the wavelength routers are dynamic wavelength routers.

24. The network of claim 12 wherein the first, second, third and fourth all-optical broadcasting local area networks each comprises
a first splitter/combiner having down access ports and at least one up access port, each down access port being adapted to be connected to an access port,
a second splitter/combiner having down access ports and at least one up access port, each down access port being adapted to be connected to an access port,
a third splitter/combiner having down access ports and at least one up access port, the down access ports of the third splitter/combiner being coupled to the up access ports of the first and second splitter/combiners, and the up access port of the third splitter/combiner being coupled to the local bypass means.

25. The network of claim 24 wherein
the first and second wavelength router means are each coupled to broadcasting networks.

26. The network of claim 25 wherein the wavelength router means comprises a static wavelength router.

27. The network of claim 25 wherein the wavelength router means comprises a dynamic wavelength router.

28. The network of claim 25 wherein the connect means comprises optical fibers.

29. The network of claim 25 wherein the connect means is selected from the group consisting of a dynamic frequency changer, a wavelength router, and optical switches coupled to optical fibers.

* * * * *